United States Patent [19]
Logsdon

[11] 3,807,457
[45] Apr. 30, 1974

[54] CLOSURE FOR PIPE AND PIPE FITTINGS

[76] Inventor: Duane D. Logsdon, 1719 Canyon Rd., Fullerton, Calif. 92631

[22] Filed: May 19, 1972

[21] Appl. No.: 255,013

[52] U.S. Cl. .................. 138/89, 220/42 C, 220/27
[51] Int. Cl. ............................................ F16l 55/10
[58] Field of Search..... 220/42 C, 27; 138/89, 96 R; 285/3, 4

[56] References Cited
UNITED STATES PATENTS

| | | | |
|---|---|---|---|
| 3,654,965 | 4/1972 | Gramain | 138/89 |
| 2,596,182 | 5/1952 | Sosaya | 285/3 |
| 3,621,623 | 11/1971 | Downes | 138/96 R |
| 3,606,074 | 9/1971 | Hayes | 220/42 C |

Primary Examiner—George T. Hall

[57] ABSTRACT

A closure is disclosed which is formed as a one-piece unit of a somewhat flexible, imporous, thin self-supporting polymer material. This closure includes an internal annular wall capable of being used with a pipe as a plug-like structure and an external annular wall capable of fitting as a skirt around a pipe fitting. A knock out groove is provided in the closure so that an opening can be created in it after the closure has been utilized for test or similar purposes. The annular walls are preferably tapered and flexible to accommodate a lack of concentricity of the pipe and pipe fittings with which the closure is adapted to be used.

4 Claims, 3 Drawing Figures

PATENTED APR 30 1974 3,807,457
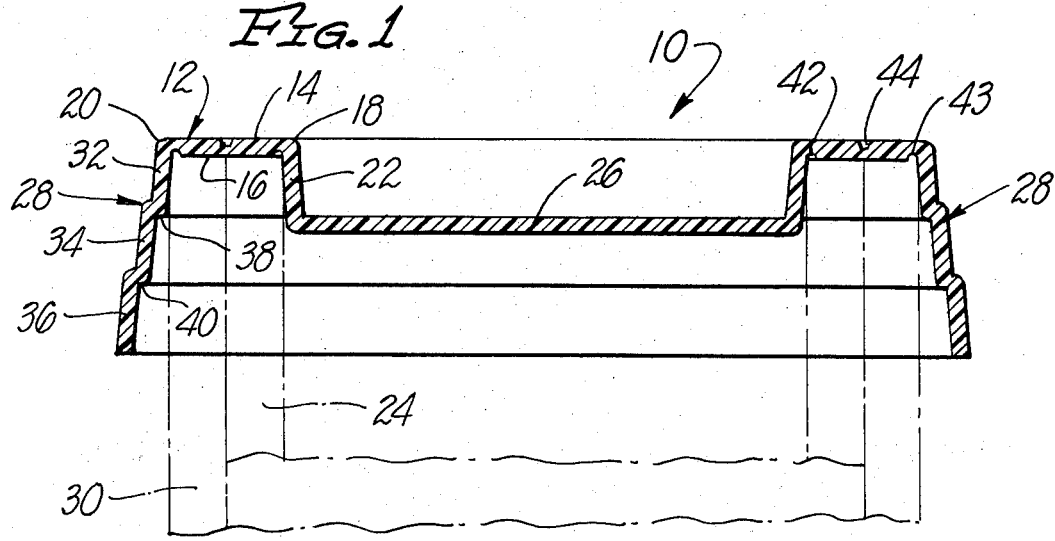
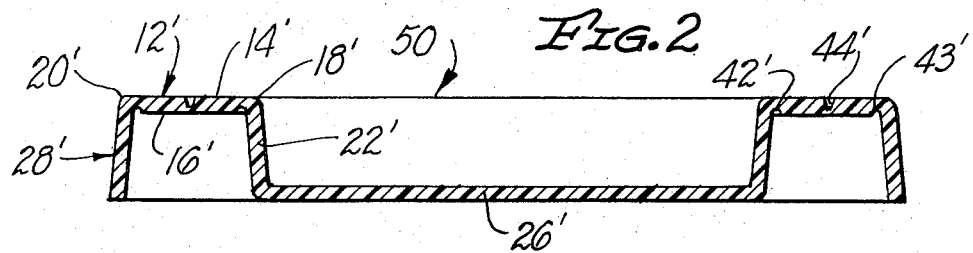
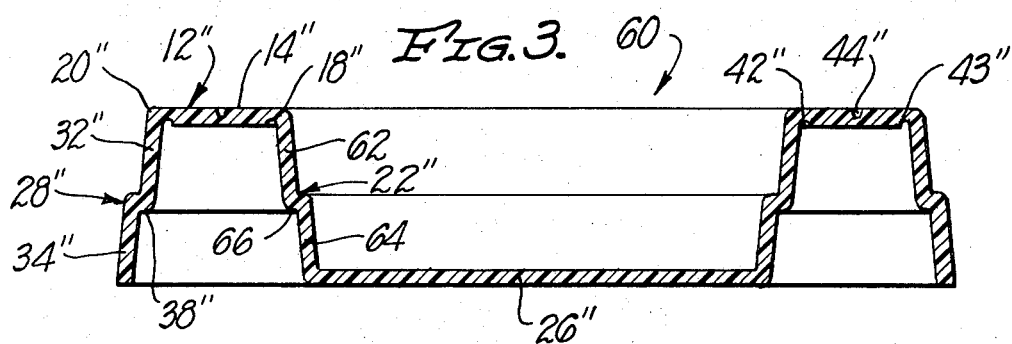

3,807,457

CLOSURE FOR PIPE AND PIPE FITTINGS

CROSS-REFERENCE TO RELATED APPLICATIONS

This application contains subject matter common to that set forth and claimed in the Duane D. Logsdon pending U.S. application Ser. No. 795,624, titled "Pipe Closure", filed Jan. 31, 1969. The entire disclosure of this co-pending application is incorporated herein by reference.

BACKGROUND OF THE INVENTION

So-called "plastic" pipe and pipe fittings are now commonly utilized in the plumbing industry because of a number of factors which are unimportant to an understanding of the present invention. Such pipe and pipe fittings are normally formed out of a rigid or comparatively rigid polymer material. The advent of such pipe and pipe fittings has created a demand for the development of new and improved "secondary" fittings and structures which are especially adapted to be utilized with such pipe and fittings.

In particular there has been a need for new and improved test caps capable of being utilized with such plastic pipe and fittings. With prior threaded pipe and fittings it was comparatively simple for a plumber to close off a pipe or a fitting with a plug or cap when testing a part of a plumbing system and then to unscrew such a pipe or cap in extending the system tested. Because of the inherent nature of plastic pipe and fittings it has been impossible to test a piping system in this manner.

As a result of this various expedients have been adopted for use in testing systems using plastic pipe and fittings. Such expedients have included discs of polymer material to be glued to the end of a pipe or fitting and various types of caps or plugs to be secured to the ends of fittings. The noted co-pending application Ser. No. 795,624 discloses one specific structure in which such a cap includes an internal knock out opening defined by a groove so that after the cap is utilized for test purposes the interior of the cap may be opened in order to permit a pipe to be attached to a piping system terminating in the test cap.

While unquestionably these prior structures have been utilitarian there have also been problems in connection with them. Some of the prior expedients utilized have been relatively difficult and time-consuming to use. In the plumbing field time is quite important from an economic standpoint. Further, plumbers have normally had to stock differently sized structures for accommodating various different types of pipe and fittings constructed in accordance with industry standards. This has tended to be comparatively disadvantageous because it has necessitated handling and stocking what may be regarded as an undesirably large number of parts of various sizes.

Another not initially apparent economic consideration has also entered into the field of different structures for use in sealing off pipe and pipe fittings for testing purposes. Because of the relatively high costs of polymer materials it has been desired to make such structures as thin as reasonably possible. This has lead to a problem because relatively thin cylindrical skirts on pipe caps or plugs and the like are relatively prone to crack or otherwise break when they are subjected to unintended physical stresses and strains.

Such stresses and strains have been encountered in connection with various testing structures because of the fact that pipe and pipe fittings as manufactured normally not to have completely cylindrical surfaces although they are manufactured so as to have such surfaces. This is considered to be a consequence of the difficulties in adequately controlling injection molding and extrusion techniques as are used in forming plastic pipe and fittings. When such pipe and fittings are formed so as to be non-cylindrical in nature and are used with test structures of a comparatively thin plastic material of a cylindrical shape, they tend to exert forces on the test structures which will occasionally lead to the test structures cracking or otherwise not fitting the way they should.

BRIEF SUMMARY OF THE INVENTION

A broad objective of the present invention is to provide new and improved closures for pipe and pipe fittings which are primarily designed so that they can be utilized in testing a piping or plumbing system prior to the extension of such a system. A related objective of this invention is to provide new and improved closures which overcome various limitations and defects of prior related test structures and closures as are indicated in the preceding discussion.

Another objective of this invention is to provide closures as described which can be used with a different types and sizes of pipe and pipe fittings so as to minimize the inventory of test structures which must normally be handled by a plumber. Still further objectives of the invention are to provide closures as described which can be easily and conveniently manufactured utilizing a comparatively small amount of polymer material at a minimal cost, which can be easily and conveniently used, and which are capable of giving satisfactory performance.

In accordance with this invention these and various related objectives of the invention are achieved in a closure formed as a one-piece, flexible, self-supporting polymer body shaped so as to include a ring shaped flat top portion, an internal annular wall secured to the interior edge of the top portion so as to extend from the bottom of the top portion, a closure wall closing off the extremity of said internal annular wall remote from the top portion, an external annular wall secured to the exterior of the top portion so as to extend from the bottom of the top portion and means defining a knock out groove located within the top portion between and concentric with the interior and exterior edges of the top portion.

BRIEF DESCRIPTION OF THE DRAWING

A summary of this type is not intended to indicate all of the details and features of a specific invention. Further details relative to closures of the present invention will be apparent from a detailed consideration of the remainder of this specification including the appended claims and the accompanying drawing in which:

FIG. 1 is a cross-sectional view of a presently preferred embodiment or form of a closure in accordance with this invention in which a pipe and a fitting capable of being utilized with this closure are illustrated by phantom lines;

FIG. 2 is a cross-sectional view similar to FIG. 1 of a modified closure in accordance with this invention; and FIG. 3 is a cross-sectional view similar to FIG. 1 of a further modified closure in accordance with this invention.

The various closures illustrated in the drawing are not to be taken as closures of this invention drawn to a precise scale. These closures are specific structures embodying the intangible concepts of the present invention set forth and defined in the appended claims and are illustrated in such a way as to facilitate an understanding of these concepts. These concepts can be utilized in other somewhat differently appearing closures of various sizes through the use or exercise of routine engineering skill.

DETAILED DESCRIPTION

In FIG. 1 of the drawing there is shown a closure 10 of the present invention formed as a one-piece body out of a flexible, impervious or non-porous, self-supporting polymer composition. This closure 10 may be conveniently formed out of a wide variety of different polymers or plastics. It is preferably formed of a plastic material of any one of several types such as are commonly utilized in the manufacture of plastic pipes and fittings. The material within the closure 10 should preferably be of such a nature that it can be conveniently utilized with various plastic pipes and fittings in such a manner that it is adhered to such pipes and fittings through the use of a common adhesive.

This closure 10 includes a ring shaped, flat top portion 12 having a top 14, a bottom 16, an interior circular edge 18 and a concentric exterior circular edge 20. This interior edge 18 is attached to an internal annular wall 22 which extends from the bottom 16. This wall 22 may be cylindrical. However, it is preferred to have it shaped so that it tapers inwardly from the bottom 16 to the top portion 12.

The degree of the taper applied to the wall 22 will be varied depending upon the specific material utilized in forming the closure 10, the flexibility of this wall 22 and the dimensions of a specific closure 10. Preferably it is tapered at an angle of from about 3 to about 7° away from the axis of said top portion 12. This taper of the wall 22 is designed so that the wall 22 may be easily fitted as a plug or stopper into the end of a pipe, such as the pipe 24 shown in phantom in FIG. 1.

When the closure 10 is used in connection with a pipe such as the pipe 24, an internal closure wall 26 closing off the extremity of the internal wall 22 serves to completely seal off the pipe 24. The taper of the internal wall 22 should not be so great that it will not fit snugly or closely within the interior of the pipe 24. It is considered that this taper is advantageous in facilitating insertion of the wall 22 within the pipe 24, and in particular in facilitating insertion in such a manner that any adhesive applied to the exterior of the wall 22 will tend to remain in place as the wall 22 is inserted within the pipe 24.

Further, the taper of the wall 22 is considered to facilitate a minor amount of deformation or bending of this wall 22 in case the pipe 24 should be out of round or non-concentric in character. This is important when the closure 10 is formed so as to be as thin as reasonably possible in an effort to save material within this closure 10. Such deformation enables the wall 26 to be thin without there being any significant chance of this wall 26 cracking because of stresses and strains set up as a result of such non-concentricity.

In the closure 10 an external annular wall 28 is secured to the exterior edge 20. Although this wall 28 may also be cylindrical in nature it is also preferred that it be tapered at an angle as indicated in the preceding discussion so as to flare outwardly from the bottom 16 of the top portion 12. As is the case with the wall 22, this slight taper is considered to facilitate the use of the closure 10 and to facilitate the wall 28 adjusting by deformation or flecture to use on an out-of-round part so that the chances of the wall 28 being cracked or otherwise damaged by unnecessary stresses and strains being set up if this part is out of round are minimized.

The wall 28 is specifically designed so that it will also fit closely around the exterior of a cylindrical member such as the member 30 shown in phantom in FIG. 1 of the drawing. It is to be understood that the closure 10 is adapted to be utilized with either a member such as the member 30 or a pipe such as the pipe 24. This closure 10 is not intended to be simultaneously utilized with both.

This member 30 will normally be a cylindrical extremity of one type or another on a pipe fitting. Since within industry standards such extremities may vary somewhat in external diameter when they have common internal diameters, it is preferred to form the external wall 28 as a segmental wall consisting of a plurality of annular segments 32, 34 and 36 which are separated from one another by shoulders 38 and 40 extending generally parallel to the top portion 12.

With this construction normally a fitting sized to a particular closure 10 will fit closely within one or the other of the segments 32, 34 and 36 so that a seal will be formed between it and the wall 28. With the construction described because of the taper, the wall 28 can normally be easily located around a member such the member 30 with a satisfactory amount of glue initially applied to such a member remainding between it and the wall 28 to form a seal.

If a member such as the member 30 is of an external diameter such that it will not fit within the wall 28 against the bottom 16, the minor amount of glue which may tend to be displaced during assembly of the closure 10 on the member 30 will not cause difficulties. If, however, the external diameter of a member such as the member 30 is such that this member will fit within the wall 28 flush against the bottom 16 it is preferred to include within the closure 10 a small annular glue groove 42 as shown. Such a glue groove 42 is shown and described in detail in the aforenoted application Ser. No. 795,624. If desired, a similar groove 43 may be located on the bottom 16 adjacent to the wall 22.

It is preferred to form the closure 10 so as to locate in the top 14 of the top portion 12 an annular knock out groove 44 which is concentric with the edges 18 and 20. Preferably, this groove 44 is of a diameter at least as great as the diameter of a member such as the member 30 to be utilized with the closure 10. This is to facilitate the central area or region of the closure 10 consisting of the walls 22 and 26 and part of the top portion 12 being knocked out of the closure 10 by a physical blow, such as a hammer blow, after this closure 10 has been installed on a member such as the member 30. This knock out groove 44 enables the closure 10 to be utilized for test purposes on a member such as the member 30 so that after testing the central portion noted may conveniently be removed as indicated so that a pipe (not shown) may be slipped within the member 30 so as to be secured to it.

In FIGS. 2 and 3 of the drawing there are shown modified closures 50 and 60 of the present invention which are essentially very similar to the closure 10 described in the preceding. In the interest of brevity, those parts of the closures 50 and 60 which are the same or nearly the same as corresponding parts of the closure 10 are designated in FIGS. 2 and 3 of the drawing by the primes and the double primes respectively, of the numerals previously utilized to designate such parts. Such parts are similarly designated when necessary for explanatory purposes in this specification.

The closure 50 differs from the closure 10 in that the external wall 28' is not divided up into individual segments 32, 34 and 36 previously described. This closure 50 is primarily intended to be utilized with pipe fittings which do not vary in external diameter.

The closure 60 shown in FIG. 3 of the drawing differs from the closure 10 in that it only includes two of the segments, specifically the segments 32'' and 34'' in the wall 28''. Within the closure 60 the internal wall 22'' is divided up into segments 62 and 64 separated by a shoulder 66 in a similar manner to the manner in which the wall 28 in the closure 10 is segmented. This is to enable the closure 60 to be utilized internally with pipes of different diameters.

In all of the closures shown the various parts are separated from one another by rounded corners in order to minimize stresses and strains within these closures to the maximum reasonable extent. This is considered important in enabling these closures to be manufactured so as to be as thin as reasonably possible without there being danger of these closures cracking during use.

From a careful consideration of the aforegoing it will be realized that the described closures may be easily and conveniently utilized with a minimum of difficulty. These closures are considered to answer a need in the industry for closures having several utilities in sealing off pipe fittings and pipes so that inventories may be minimized. From the preceding it will be realized that the described closures are simple, effective devices which may be easily and conveniently employed by plumbers.

I claim:

1. A closure capable of being used to close off a cylindrical member and capable of being opened after closing off such a cylindrical member and while secured to such a member so that a pipe may be inserted through the interior of said closure and secured to the interior of such a member, said closure also being capable of being used to fit within and close off a pipe having a smaller exterior diameter than the exterior diameter of such a member, said closure comprising:

a one-piece, flexible, impervious, self-supporting, polymer body shaped so as to include, a ring shaped flat top portion having a top and a bottom and interior and exterior concentric edges, said top portion including means defining an annular glue groove in said bottom of said top portion adjacent to said external annular wall, an internal annular wall secured to the interior edge of said top portion so as to extend from the bottom of said top portion, said internal annular wall being tapered inwardly from said top portion so as to be capable of being easily inserted so as to fit closely into the interior of a pipe and being capable of bending to accommodate any non-uniformity in the internal shape of such a pipe, a closure wall closing off the extremity of said internal annular wall remote from said top portion, said closure wall extending parallel to said top portion, an external annular wall secured to the exterior of said top portion so as to extend from the bottom of said top portion, said external annular wall being tapered outwardly from said top portion so as to be capable of being easily inserted so as to fit closely around the exterior of a cylindrical pipe and being capable of bending so as to accommodate any non-uniformity in the external shape of such a member, said internal and external annular walls being tapered at an angle of from about 3 to 7° to the axis of said top portion, means defining an annular knock out groove located within said top portion between and concentric with said interior and said exterior edges, said groove having a diameter sufficient to accommodate another cylindrical pipe having an external diameter corresponding to the internal diameter of said first mentioned pipe to be inserted through said cap so as to be secured to the interior of the first mentioned pipe, said closure wall, said internal annular wall and a part of said top portion being capable of being severed from the remainder of said cap by a physical blow because of the reduced strength of said top portion along said knock out groove.

2. A closure as claimed in claim 1 wherein:

said external annular wall is a stepped wall having a plurality of annular segments separated from one another so that said external wall can be utilized with differently sized cylindrical members.

3. A closure as claimed in claim 1 wherein:

said internal annular wall is a stepped wall having a plurality of annular segments separated from one another so that said internal wall can be used with a plurality of differently sized pipes.

4. A closure as claimed in claim 1 wherein:

said external annular wall is a stepped wall having a plurality of annular, tapered segments separated from one another so that said external wall can be utilized with differently sized cylindrical members, and said internal annular wall is a stepped wall having a plurality of annular, tapered segments separated from one another so that said internal wall can be used with a plurality of different sized pipes.

* * * * *